United States Patent
Sun et al.

(10) Patent No.: US 9,697,585 B2
(45) Date of Patent: Jul. 4, 2017

(54) METHOD AND APPARATUS FOR DISPLAYING STATISTICAL CHART

(71) Applicant: TENCENT TECHNOLOGY (SHENZHEN) COMPANY LIMITED, Shenzhen (CN)

(72) Inventors: Xiao Sun, Shenzhen (CN); Kexin Song, Shenzhen (CN); Junyi Cai, Shenzhen (CN); Yingxue Liu, Shenzhen (CN); Chengjun Li, Shenzhen (CN); Xiaopeng Song, Shenzhen (CN); Suning Wang, Shenzhen (CN); Yongjun Wang, Shenzhen (CN); Xinggang Li, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 150 days.

(21) Appl. No.: 14/710,051

(22) Filed: May 12, 2015

(65) Prior Publication Data
US 2015/0242997 A1    Aug. 27, 2015

Related U.S. Application Data (63) Continuation of application No. PCT/CN2013/083044, filed on Sep. 6, 2013.

(30) Foreign Application Priority Data

Nov. 14, 2012 (CN) .......................... 2012 1 0456836

(51) Int. Cl.
*G06T 3/60* (2006.01)
*G06T 11/20* (2006.01)

(52) U.S. Cl.
CPC .............. *G06T 3/60* (2013.01); *G06T 11/206* (2013.01)

(58) Field of Classification Search
None
See application file for complete search history.

(56) References Cited

U.S. PATENT DOCUMENTS

2002/0033836 A1* 3/2002 Smith .................. G06F 1/1626
                                                                345/649
2004/0239690 A1* 12/2004 Wyatt .................... G06T 3/606
                                                                345/649

(Continued)

FOREIGN PATENT DOCUMENTS

CN    101369210 A    2/2009
CN    101834938 A    9/2010

(Continued)

OTHER PUBLICATIONS

International Search Report for International Application No. PCT/CN2013/083044 dated Nov. 28, 2013, and its English translation thereof.

*Primary Examiner* — Maurice L McDowell, Jr.
(74) *Attorney, Agent, or Firm* — Harness, Dickey & Pierce, P.L.C.

(57) ABSTRACT

A method and an apparatus for displaying a statistical chart. The method includes determining whether a screen rotation event of switching from portrait-orientation display to landscape-orientation display is received. The method further includes obtaining additional to-be-shown data added during switch from a portrait-orientation-display drawing area to a landscape-orientation-display drawing area if yes, and drawing the landscape-orientation-display drawing area. The method further includes displaying a statistical chart in the drawn landscape-orientation-display drawing area, where the additional to-be-shown data is shown in the statistical (Continued)

chart. A statistical chart fills a drawing area in a landscape-orientation state.

12 Claims, 7 Drawing Sheets

(56) References Cited

U.S. PATENT DOCUMENTS

| | | | | |
|---|---|---|---|---|
| 2010/0218113 | A1* | 8/2010 | White | G06F 1/1626 |
| | | | | 715/746 |
| 2012/0303548 | A1* | 11/2012 | Johnson | G06Q 40/04 |
| | | | | 705/36 R |

FOREIGN PATENT DOCUMENTS

| | | | |
|---|---|---|---|
| CN | 101882050 | A | 11/2010 |
| JP | 2010109707 | A | 5/2010 |

\* cited by examiner

```
                                        ┌─ 301
┌─────────────────────────────────────┐
│ Determine whether a screen rotation event of switching
│ from portrait-orientation display to landscape-orientation
│ display is received, and if yes, obtain additional to-be-
│ shown data added during switch from a portrait-
│ orientation-display drawing area to a landscape-
│ orientation-display drawing area, and draw the landscape-
│ orientation-display drawing area
└─────────────────────────────────────┘
                    │
                    ▼                   ┌─ 302
┌─────────────────────────────────────┐
│ Display a statistical chart in the drawn landscape-
│ orientation-displayed drawing area, where the additional
│ to-be-shown data is shown in the statistical chart
└─────────────────────────────────────┘
```

METHOD AND APPARATUS FOR DISPLAYING STATISTICAL CHART

CROSS-REFERENCE TO RELATED APPLICATIONS

This application is a continuation of International Application No. PCT/CN2013/083044, filed Sep. 6, 2013. This application claims the benefit and priority of Chinese Application No. 201210456836.3, filed Nov. 14, 2012. The entire disclosures of each of the above applications are incorporated herein by reference.

FIELD

The present disclosure relates to a method and an apparatus for displaying statistical chart.

BACKGROUND

This section provides background information related to the present disclosure which is not necessarily prior art.

Nowadays, in this information era, various types of information devices emerge as necessary. These information devices include fixed-line phones and mobile phones for transmitting voice, servers and personal computers for sharing and processing information resources, and various televisions for displaying video data. These devices are produced to address actual needs in particular fields. With the emergence of e-commerce, computers, and communication (3C), people pay more attention to studies on comprehensive use of information devices in different fields, so as to make full use of existing resources and devices and provide people with better services. A smartphone is similar to a personal computer and has an independent operating system. Users can install programs provided by a third-party service provider, such as software and games on a smartphone by themselves, and can use these programs to expand functions of the mobile phone.

Securities are general terms for various certificates of economic interests and rights, and are written documents certifying that a security holder has the right to gain entitled interests in accordance with content recorded in the security. According to characters, securities are classified as evidence securities, voucher securities, negotiable securities, and the like. Some securities can circulate on the market. Securities invigorate finance, economy, and investment. Securities usually include stocks, bonds, funds, warrants, and the like. A securities transaction refers to a behavior of transferring a security by a security holder to another investor according to transaction rules. A stock is a negotiable security, which is a share certificate issued by a joint stock company to an investor during capital financing, and represents the ownership of its holder (that is, a shareholder) in the joint stock company. Various stock-related applications (Application) exist on present intelligent terminals.

In these applications, when a terminal shows a statistical chart on a screen, during the switch from landscape-orientation display to portrait-orientation display or the switch from portrait-orientation display to landscape-orientation display, the terminal cannot dynamically adjust a data volume of shown content according to a change of a drawing area, and therefore, cannot fully use a frame size of the screen, thereby resulting in low utilization of the screen.

SUMMARY

This section provides a general summary of the disclosure, and is not a comprehensive disclosure of its full scope or all of its features.

Various embodiments of the present disclosure provide a method for displaying a statistical chart, which can dynamically adjust a data volume of shown content according to a change of a drawing area, so as to improve utilization of a screen.

Various embodiments further provide an apparatus for displaying a statistical chart, which can dynamically adjust a data volume of shown content according to a change of a drawing area, so as to improve utilization of a screen.

Specific methods of the various embodiments are as follow:

A method for displaying a statistical chart is provided, and includes:

determining whether a screen rotation event of switching from portrait-orientation display to landscape-orientation display is received, and obtaining additional to-be-shown data added during switch from a portrait-orientation-display drawing area to a landscape-orientation-display drawing area if yes, and drawing the landscape-orientation-display drawing area; and displaying a statistical chart in the drawn landscape-orientation-display drawing area, the additional to-be-shown data being shown in the statistical chart.

An apparatus for displaying a statistical chart is provided, and includes an additional to-be-shown data obtaining unit, a landscape-orientation-display drawing area drawing unit, and a statistical chart showing unit;

the additional to-be-shown data obtaining unit being configured to obtain additional to-be-shown data added during switch from a portrait-orientation-display drawing area to a landscape-orientation-display drawing area;

the landscape-orientation-display drawing area drawing unit being configured to determine whether a screen rotation event of switching from portrait-orientation display to landscape-orientation display is received, and draw the landscape-orientation-display drawing area if yes, and the width of the landscape-orientation-display drawing area being equal to the height of a screen; and the statistical chart showing unit being configured to display a statistical chart in the drawn landscape-orientation-display drawing area, the additional to-be-shown data being shown in the statistical chart.

Various embodiments further provide a method for displaying a statistical chart, including:

drawing, when a drawing area changes from a first drawing area to a second drawing area, a statistical chart by using to-be-shown data corresponding to a size of the second drawing area; and displaying the statistical chart in the second drawing area.

Various embodiments further provide an apparatus for displaying a statistical chart, including:

a statistical chart drawing unit, configured to draw, when a drawing area changes from a first drawing area to a second drawing area, a statistical chart by using to-be-shown data corresponding to a size of the second drawing area; and a statistical chart displaying unit, configured to display the statistical chart in the second drawing area.

As can be seen from the foregoing technical methods, in the various embodiments, additional to-be-shown data added during the switch from a portrait-orientation-display drawing area to a landscape-orientation-display drawing area is obtained. Whether a screen rotation event of switching from portrait-orientation display to landscape-orientation display is received is determined and the landscape-orientation-display drawing area is drawn if yes; and a statistical chart is displayed in the drawn landscape-orientation-display drawing area, where the additional to-beshown data is shown in the statistical chart. It can be seen that, after the various embodiments are applied, when a terminal is switched from a portrait-orientation state to a landscape-orientation state, more data of a statistical chart can be obtained, so that the statistical chart can fill a drawing area in the landscape-orientation state. Through this method, a data volume of shown content can be dynamically adjusted according to a change of a drawing area, thereby greatly improving utilization of a screen.

Further areas of applicability will become apparent from the description provided herein. The description and specific examples in this summary are intended for purposes of illustration and are not intended to limit the scope of the present disclosure.

DRAWINGS

The drawings described herein are for illustrative purposes of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

To make the objectives, technical solutions, and advantages of the present disclosure clearer, the present disclosure is further described in detail with reference to the accompanying drawings in the following.

A statistical chart is a technical chart displaying statistical information with a curve or a candlestick on a coordinate chart. For example, in a stock transaction trend chart, a horizontal coordinate axis usually shows a fixed time period, an upper half of a vertical axis shows a stock price or an index within the time period, and a lower half shows a trade volume within the time period. Statistical charts may also be classified into curve trend charts, candlestick trend charts, and the like. Statistical charts have already become a necessary tool used by investors to analyze statistical information during daily investment.

The height of a screen of a terminal is usually greater than the width of the screen of the terminal. A terminal usually shows a trend chart in a landscape orientation or a portrait orientation. For example, when the terminal is in a portrait-orientation state, a drawing area is the width of a screen of the terminal. When the terminal is switched to a landscape-orientation state, the drawing area becomes the height of the screen of the terminal.

Presently, in various trading trend applications, a data volume of shown content cannot be dynamically adjusted according to a change of a drawing area.

Figure 1:
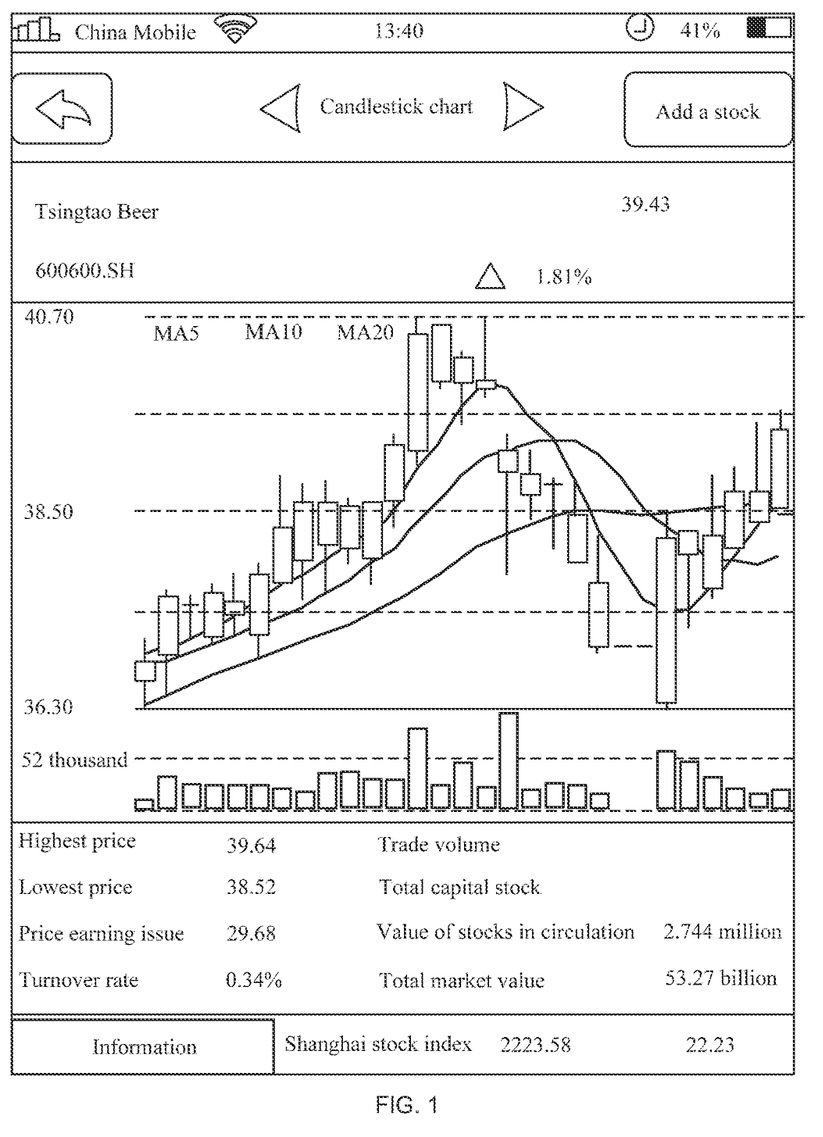
FIG. 1 is a diagram of a statistical chart displayed in a portrait orientation.
Figure 2:
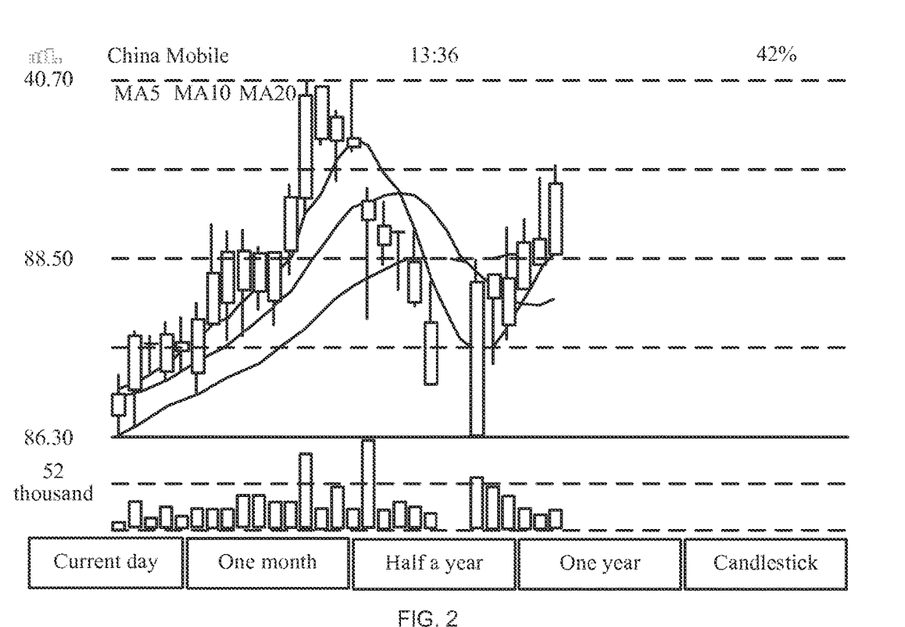
FIG. 2 is a diagram of a statistical chart displayed in a landscape orientation.

FIG. 1 is a diagram of a statistical chart displayed in a portrait orientation. FIG. 2 is a diagram of a statistical chart displayed in a landscape orientation.

As can be seen from FIG. 1 and FIG. 2, when a terminal shows a statistical chart on a screen, during the switch from portrait-orientation display to landscape-orientation display, the terminal cannot dynamically adjust a data volume of content shown in a landscape orientation according to a change in a drawing area. Therefore, a size of the screen cannot be fully used, which results in low utilization of the screen.

Figure 3:
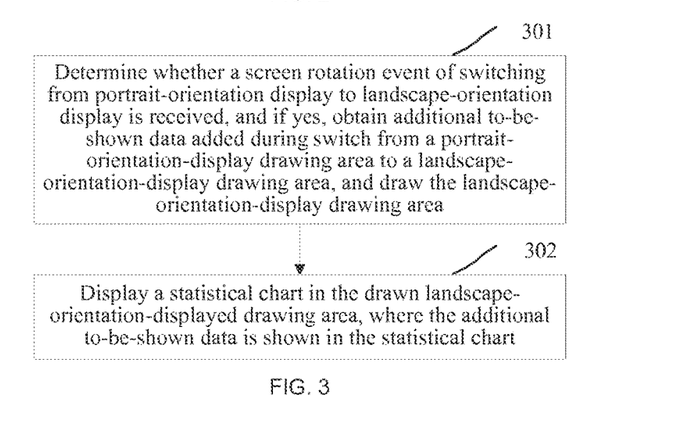
FIG. 3 is a flowchart of a method for displaying a first statistical chart according to various embodiments.

FIG. 3 is a flowchart of a method for displaying a first statistical chart according to various embodiments.

As shown in FIG. 3, the method includes the following.

Block 301: Determine whether a screen rotation event of switching from portrait-orientation display to landscape-orientation display is received, and if yes, obtain additional to-be-shown data added during the switch from a portrait-orientation-display drawing area to a landscape-orientation-display drawing area, and draw the landscape-orientation-display drawing area.

Because the height of a screen of a terminal is usually greater than the width of the screen of the terminal, during the switch from a portrait-orientation display state to a landscape-orientation display state, the terminal can actually show more stock data. When in the portrait-orientation display state, the terminal already obtains relevant data about a statistical chart from a statistical information server. Therefore, the terminal also needs to obtain, from the statistical information server, additional to-be-shown data added during the switch from a portrait-orientation-display drawing area to a landscape-orientation-display drawing area.

A display range of the portrait-orientation-display drawing area and a display range of the landscape-orientation-display drawing area may be predetermined herein, and the portrait-orientation-display drawing area and the landscape-orientation-display drawing area may be determined based on a size of the screen of the terminal.

In the existing technology, when a stock market trend chart is displayed, in order to make full use of a size of a screen, an entire drawing area is usually filled with stock trend lines. A great difference exists between a drawing area of a portrait orientation and a drawing area of a landscape orientation on the terminal. In a landscape-orientation state, there is a greater frame along a horizontal axis and more data can be shown. During the switch from a portrait-orientation state to a landscape-orientation state, or at other moments, more data that remains to be shown (that is, additional to-be-shown data) may be obtained, so that a statistical chart fills an entire drawing area in the landscape-orientation state.

The additional to-be-shown data is in direct proportion to a difference between the landscape-orientation-display drawing area and the portrait-orientation-display drawing area. When the landscape-orientation-display drawing area is bigger than the portrait-orientation-display drawing area, more additional to-be-shown data needs to be obtained from the statistical information server.

The terminal may include, but is not limited to, a functional mobile phone, a smartphone, a palmtop computer, a personal computer (PC), a tablet computer, and a personal digital assistant (PDA). Although specific examples of the terminal are listed above in detail, one skilled in the art may realize that these listed examples are merely intended for illustration rather than limitation on the protection scope of the various embodiments.

Although a statistical chart is described by using a stock trend chart as an example, one skilled in the art may realize that the statistical chart can be used to not only display statistics of a market trend in the stock market, but can also be used to show statistics about market trends of gold, funds, warrants, futures, and the like.

The terminal is applicable to any operating system of an intelligent terminal. Specifically, operating systems that can be used include, but are not limited to, Palm OS, Symbian, Windows mobile, Linux, Android, iPhone OS, Black Berry OS 6.0, and Windows Phone series.

The terminal may specifically use an Android operating system. Android versions that the terminal can use include, but are not limited to, Astro Boy (Android Beta), Clockwork Robert (Android 1.0), Cupcake (Android 1.5), Doughnut (Android 1.6), Muffin (Android 2.0/2.1), Froyo (Android 2.2), Ginger Bread (Android 2.3), Honeycomb (Android 3.0), Ice Cream Sandwich (Android 4.0), Jelly Bean (Jelly Bean, Android 4.1), and other versions. Specific versions of an Android platform are listed above in detail, and one skilled in the art may realize that the various embodiments are not limited to the above listed versions, but are also applicable to any other version based on an Android software framework.

Whether a gravity sensor detects the screen rotation event of switching from portrait-orientation display to landscape-orientation display may be determined. If it is determined that the gravity sensor detects the screen rotation event of switching from portrait-orientation display to landscape-orientation display, the landscape-orientation-display drawing area is drawn, where the width of the landscape-orientation-display drawing area is equal to the height of the screen.

In an implementation manner, whether a finger operation instruction, which is sent by a user to switch a display state of the screen from portrait-orientation display to landscape-orientation display, is received may be determined. If the finger operation instruction is received, the landscape-orientation-display drawing area is drawn, where the width of the landscape-orientation-display drawing area is equal to the height of the screen.

During implementation, the landscape-orientation-display drawing area may be drawn in multiple manners. For example, coordinates of an upper-left vertex or coordinates of an upper-right vertex of the landscape-orientation-display drawing area may be determined first. The landscape-orientation-display drawing area is then drawn from the top of the screen to the bottom of the screen based on the determined coordinates of the upper-left vertex or coordinates of the upper-right vertex of the landscape-orientation-display drawing area and a preset height of the landscape-orientation-display drawing area. The width of the landscape-orientation-display drawing area is equal to the height of the screen.

Coordinates of a lower-right vertex or coordinates of a lower-left vertex of the landscape-orientation-display drawing area may be determined first. The landscape-orientation-display drawing area is then drawn from the bottom of the screen to the top of the screen based on the determined coordinates of the lower-right vertex or coordinates of the lower-left vertex of the landscape-orientation-display drawing area and a preset height of the landscape-orientation-display drawing area. The width of the landscape-orientation-display drawing area is equal to the height of the screen.

Figure 4:
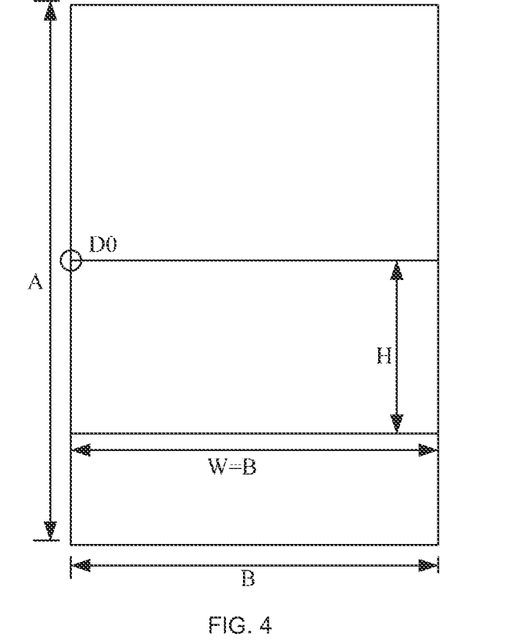
FIG. 4 is a diagram of a portrait-orientation-display drawing area in a portrait-orientation state according to various embodiments.
Figure 5:
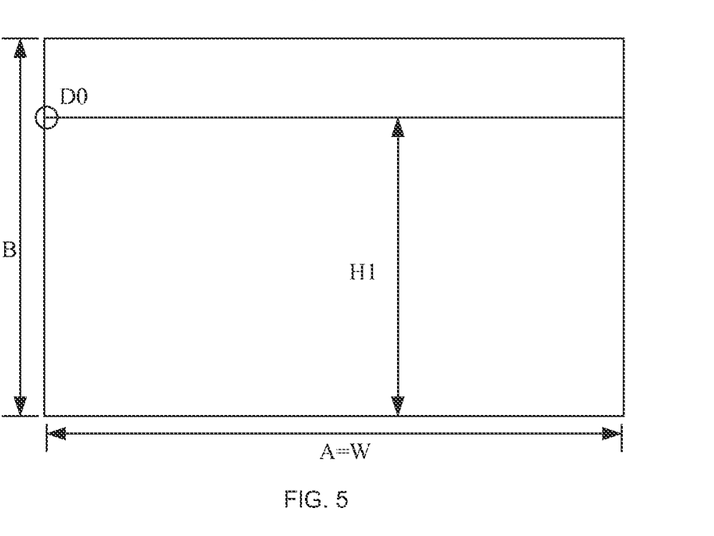
FIG. 5 is a diagram of a landscape-orientation-display drawing area in a landscape-orientation state according to various embodiments.

FIG. 4 is a diagram of a portrait-orientation-display drawing area in a portrait-orientation state according to various embodiments. FIG. 5 is a diagram of a landscape-orientation-display drawing area in a landscape-orientation state according to various embodiments.

In FIG. 4 and FIG. 5, the height of the screen of the terminal is A and the width is B. In the portrait-orientation state, the width W of the portrait-orientation-display drawing area is equal to the width of the screen (that is, W=B), and the height H of the drawing area is user-defined. After switch from the portrait-orientation state to the landscape-orientation state, the drawing area becomes larger along an X axis, that is, the width W of the landscape-orientation-display drawing area is equal to the height of the screen (that is, W=A), and the height H1 of the landscape-orientation-display drawing area may be user-defined.

In FIG. 4 and FIG. 5, a coordinate position of an upper-left vertex (DO) may be determined and a chart is then drawn according to the width and height of the landscape-orientation-display drawing area. Optionally, a coordinate position of an upper-right vertex, a lower-left vertex, or a lower-right vertex may be determined, and a chart is then drawn according to the width and height of the landscape-orientation-display drawing area.

Block 302: Display a statistical chart in the drawn landscape-orientation-display drawing area, where the additional to-be-shown data is shown in the statistical chart.

In an implementation manner, a coordinate change relationship between a coordinate system of the portrait-orientation-display drawing area and a coordinate system of the landscape-orientation-display drawing area may be determined based on the determined portrait-orientation-display drawing area and landscape-orientation-display drawing area. A statistical chart in the portrait-orientation-display drawing area is extended in the drawn landscape-orientation-display drawing area based on the coordinate change relationship between the coordinate system of the portrait-orientation-display drawing area and the coordinate system of the landscape-orientation-display drawing area. The additional to-be-shown data is shown in an extended display part of the statistical chart that is extended in the landscape-orientation-display drawing area.

Herein, in the process of displaying a statistical chart in the drawn landscape-orientation-display drawing area, a statistical chart in the portrait-orientation-display drawing area may be reserved and a top price-prompting area and a bottom trade-volume area are hidden. A coordinate change relationship between a coordinate system of the portrait-orientation-display drawing area and a coordinate system of the landscape-orientation-display drawing area is determined based on the determined portrait-orientation-display drawing area and landscape-orientation-display drawing area. The statistical chart is extended in the drawn landscape-orientation-display drawing area based on the coordinate change relationship between the coordinate system of the portrait-orientation-display drawing area and the coordinate system of the landscape-orientation-display drawing area, and the additional to-be-shown data is shown in the statistical chart. Current data of the top price-prompting area is obtained, the current data is shown in a top price-prompting area of the landscape-orientation-display drawing area, and the bottom trade-volume area is shown in the landscape-orientation-display drawing area.

For example, when a screen rotation event of switching from portrait-orientation display to landscape-orientation display is detected, a current statistical chart in a portrait-orientation state may still be displayed, and other visual parts (such as a top price-prompting area and a bottom trade-volume area) are hidden. This ideally lasts for 0.2 second. A size and a horizontal coordinate position of a trend chart in the portrait-orientation state are then changed within 0.5 second according to a target position and coordinate after the switching. For candlesticks, hidden data beyond an interface is added according to a current data size during switching. At last, rest parts (including a top price-prompting area, a bottom trade-volume area, and an operating button) in a landscape orientation are added from bottom to top.

Although a process of displaying a statistical chart is illustrated in detail by using specific time and areas as an example one skilled in the art may realize that the illustration is merely exemplary and is not intended for limitation of the various embodiments. A statistical chart is a curve drawn by using natural time and price as coordinates. Therefore, a time-based division method may affect recognition of a price curve and a time period by a user.

According to various embodiments, a time axis of the statistical chart may be divided according to a natural time period, where the natural time period at least includes at least one of day, week, month, quarter, and year. In stock applications of the existing technology, there are many technical methods for dividing a time axis according to the number of candlesticks, and some applications do not have a time axis drawn therein. According to various embodiments, a natural week, month, or year is used as a period to divide a time axis so that a user can conveniently recognize a stock price trend of a certain day or a certain date.

According to various embodiments, for daily candlesticks in the trend chart, 2 months may be used as a division unit. For weekly candlesticks in the trend chart, 6 months may be used as a division unit. For monthly candlesticks in the trend chart, 2 years may be used as a division unit. In a case in which displayed stock data cannot fill an entire screen, classified line segments cover an area with data according to an existing division rule and an area without data is ignored.

Although division of a statistical chart is illustrated in detail by using specific time as an example, one skilled in the art may realize that the illustration is merely exemplary and is not intended for limitation of the various embodiments.

Figure 6:
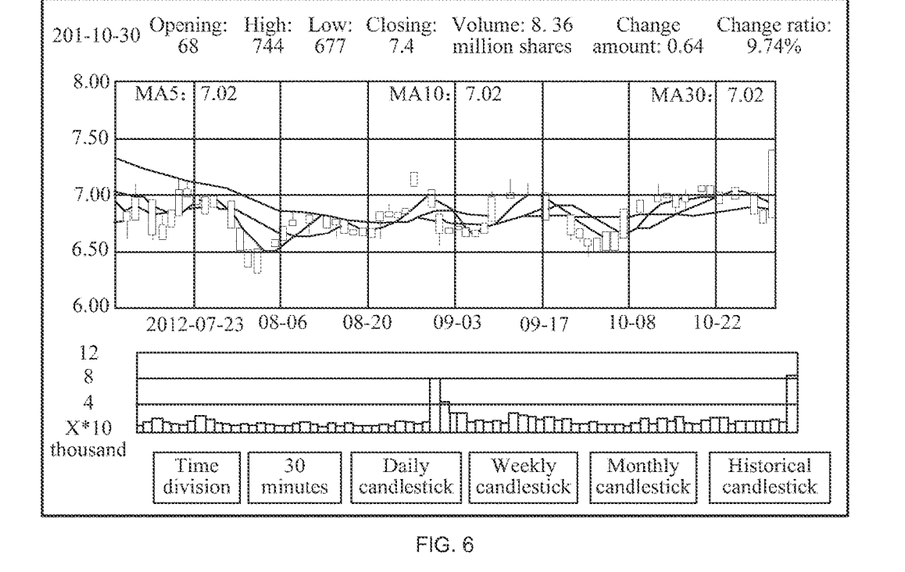
FIG. 6 is a diagram showing a statistical chart, which is equally divided according to the number of candlesticks, in a landscape-orientation state in the existing technology.
Figure 7:
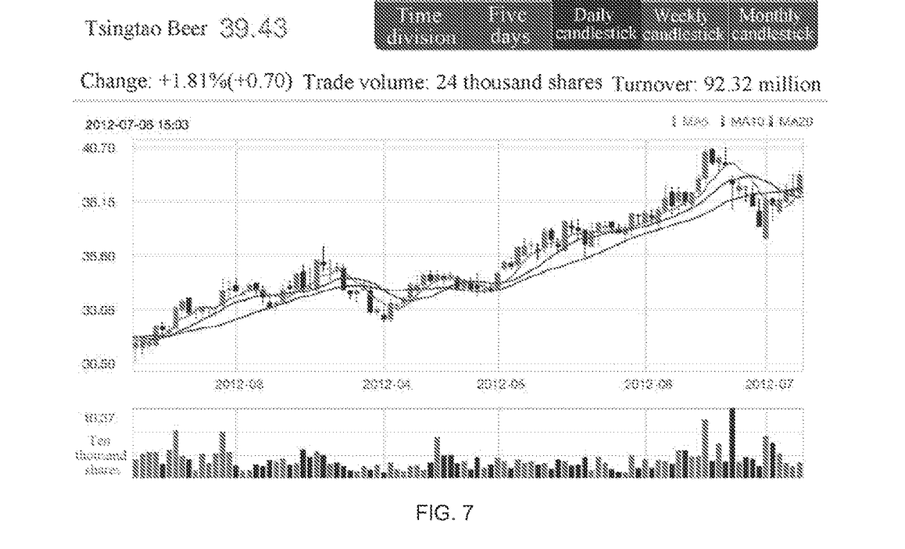
FIG. 7 is a diagram showing a statistical chart, of which a time axis is divided according to a natural time period, in a landscape-orientation state according to various embodiments.

FIG. 6 is a diagram showing a statistical chart, which is equally divided according to the number of candlesticks in a landscape-orientation state in the existing technology. FIG. 7 is a diagram showing a statistical chart, of which a time axis is divided according to a natural time period in a landscape-orientation state according to various embodiments.

In the existing technology, in a landscape-orientation state, a time axis is divided according to the average number of candlesticks. For example, as can be seen from FIG. 6, a time axis is divided according to the number of fixed trading days (10 trading days in this drawing), which makes it inconvenient for a user to understand a time period. As can be seen from FIG. 7, in various embodiments, a time axis may be divided according to a natural month, which makes it convenient for a user to understand data in a trend chart.

Figure 8:
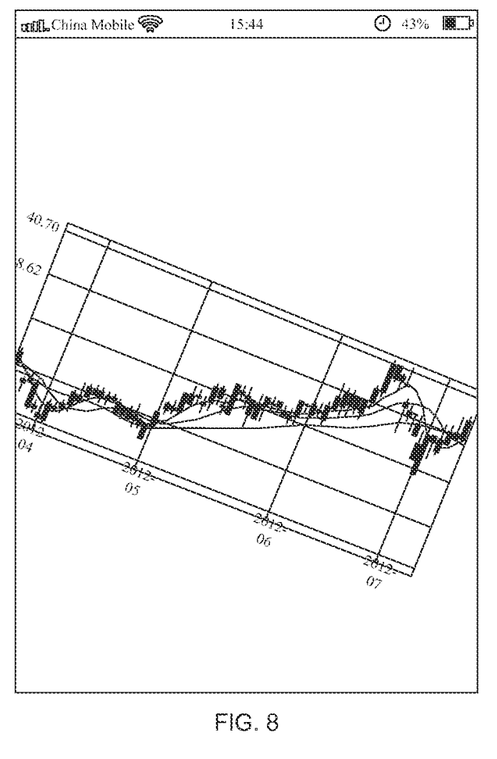
FIG. 8 is a diagram of a first switching for the switch from a portrait-orientation state to a landscape-orientation state according to various embodiments.
Figure 9:
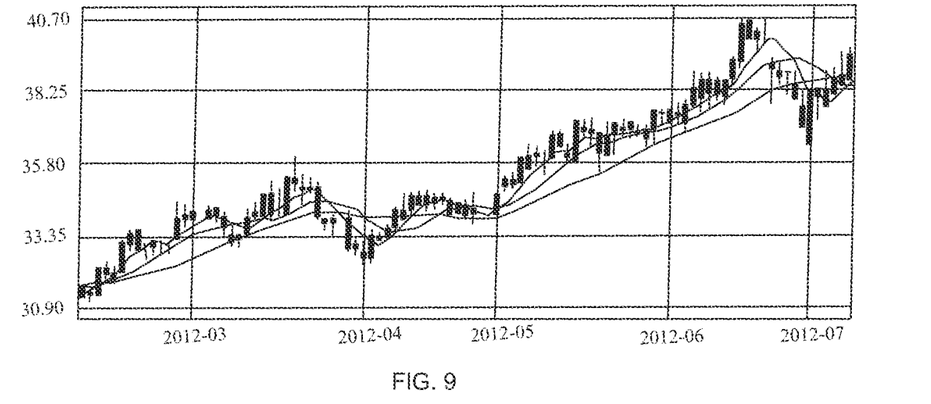
FIG. 9 is a diagram of a second switching for the switch from a portrait-orientation state to a landscape-orientation state according to various embodiments.

FIG. 8 is a diagram of a first switching for the switch from a portrait-orientation state to a landscape-orientation state according to embodiments. FIG. 9 is a diagram of a second switching for the switch from a portrait-orientation state to a landscape-orientation state according to various embodiments.

According to various embodiments, a communication connection between a terminal and a statistical information server may be implemented by using various wired or wireless communications networks. According to a relationship between an information transfer direction and time, manners for communication between the terminal and the statistical information server may be classified into simplex communication, half-duplex communication, full-duplex communication, and the like.

According to various embodiments, specific communications protocols between the terminal and the statistical information server may be agreed upon, and a format used by a data unit, information that should be included in an information unit and the meaning of the information, a connection manner, and information sending and receiving time sequences are defined in these communications protocols, so as to ensure that data in a network is smoothly transferred to a determined place. For example, communications protocols that can be used in various embodiments include, but are not limited to, Transport Control Protocol/Internet Protocol (TCP/IP), Hypertext Transfer Protocol (HTTP), Simple Mail Transfer Protocol (SMTP), and Post Office Protocol 3 (POP3).

According to various embodiments, the terminal may exchange information with the statistical information server by using various communications standards. For example, communications standards such as Global System for Mobile Communications (GSM), Wideband Code Division Multiple Access (WCDMA), Code Division Multiple Access 2000 (CDMA-2000), and Time Division-Synchronous Code Division Multiple Access (TD-SCDMA) may be used. There may be various types of formats for information exchange between the terminal and the statistical information server. For example, information formats may include, but are not limited to, a short message service (SMS)

message, an e-mail, an Instant Messaging (IM) message, a multimedia messaging service (MMS) message, and a voice message.

Before the sending of stock data to the terminal by the statistical information server, the method further includes verifying, by the statistical information server, whether an identity of the terminal is legal, and sending the stock data to the terminal when the identity of the terminal is legal, where the determining, by the statistical information server through authentication, whether an identity of the terminal is legal includes: verifying whether a fingerprint of the user of the terminal matches an authorized fingerprint, verifying whether an iris of the user matches an authorized iris, or verifying whether an International Mobile Equipment Identity (IEMI) number of the terminal is legal or whether a password set for screen saver of the terminal is correct, or the like.

Based on the foregoing detailed analysis, various embodiments further provide an apparatus for displaying a statistical chart.

Figure 10:
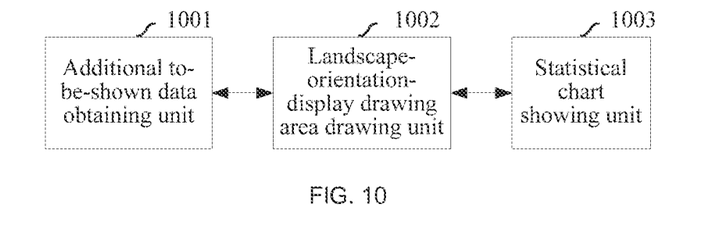
FIG. 10 is a structural diagram of an apparatus for displaying a first statistical chart according to various embodiments.

FIG. 10 is a structural diagram of an apparatus for displaying a first statistical chart according to various embodiments. As can be seen from FIG. 10, the apparatus includes an additional to-be-shown data obtaining unit 1001, a landscape-orientation-display drawing area drawing unit 1002, and a statistical chart showing unit 1003, where:

the additional to-be-shown data obtaining unit 1001 is configured to obtain additional to-be-shown data added during switch from a portrait-orientation-display drawing area to a landscape-orientation-display drawing area;

the landscape-orientation-display drawing area drawing unit 1002 is configured to determine whether a screen rotation event of switching from portrait-orientation display to landscape-orientation display is received, and if yes, draw the landscape-orientation-display drawing area, where the width of the landscape-orientation-display drawing area is equal to the height of a screen; and the statistical chart showing unit 1003 is configured to display a statistical chart in the drawn landscape-orientation-display drawing area, where the additional to-be-shown data is shown in the statistical chart.

In various embodiments, the landscape-orientation-display drawing area drawing unit 1002 is configured to determine coordinates of an upper-left vertex or coordinates of an upper-right vertex of the landscape-orientation-display drawing area; and draw the landscape-orientation-display drawing area from the top of the screen to the bottom of the screen based on the determined coordinates of the upper-left vertex or coordinates of the upper-right vertex of the landscape-orientation-display drawing area and a preset height of the landscape-orientation-display drawing area, where the width of the landscape-orientation-display drawing area is equal to the height of the screen.

The landscape-orientation-display drawing area drawing unit 1002 is configured to determine coordinates of a lower-right vertex or coordinates of a lower-left vertex of the landscape-orientation-display drawing area and draw the landscape-orientation-display drawing area from the bottom of the screen to the top of the screen based on the determined coordinates of a lower-right vertex or coordinates of a lower-left vertex of the landscape-orientation-display drawing area and a preset height of the landscape-orientation-display drawing area, where the width of the landscape-orientation-display drawing area is equal to the height of the screen.

In various embodiments, the landscape-orientation-display drawing area drawing unit 1002 is configured to determine whether a gravity sensor detects the screen rotation event of switching from portrait-orientation display to landscape-orientation display or determine whether a finger operation instruction, which is sent by a user to switch a display state of the screen from portrait-orientation display to landscape-orientation display, is received.

The landscape-orientation-display drawing area drawing unit 1002 is configured to reserve a statistical chart in the portrait-orientation-display drawing area and hide a top price-prompting area and a bottom trade-volume area; determine a coordinate change relationship between a coordinate system of the portrait-orientation-display drawing area and a coordinate system of the landscape-orientation-display drawing area based on the determined portrait-orientation-display drawing area and landscape-orientation-display drawing area; extend, in the drawn landscape-orientation-display drawing area, the statistical chart in the portrait-orientation-display drawing area based on the coordinate change relationship between the coordinate system of the portrait-orientation-display drawing area and the coordinate system of the landscape-orientation-display drawing area and show the additional to-be-shown data in the statistical chart; and obtain current data of the top price-prompting area, show the current data in a top price-prompting area of the landscape-orientation-display drawing area, and show the bottom trade-volume area in the landscape-orientation-display drawing area.

In various embodiments, the landscape-orientation-display drawing area drawing unit 1002 is configured to determine a coordinate change relationship between a coordinate system of the portrait-orientation-display drawing area and a coordinate system of the landscape-orientation-display drawing area based on the determined portrait-orientation-display drawing area and landscape-orientation-display drawing area; extend, in the drawn landscape-orientation-display drawing area, a statistical chart in the portrait-orientation-display drawing area based on the coordinate change relationship between the coordinate system of the portrait-orientation-display drawing area and the coordinate system of the landscape-orientation-display drawing area; and show the additional to-be-shown data in an extended display part of the statistical chart that is extended in the landscape-orientation-display drawing area.

In various embodiments, the statistical chart showing unit 1003 is configured to divide a time axis of the statistical chart according to a natural time period, where the natural time period at least includes at least one of day, month, quarter, and year.

Based on the foregoing detailed analysis, various embodiments further provide a system for displaying a statistical chart.

Figure 11:
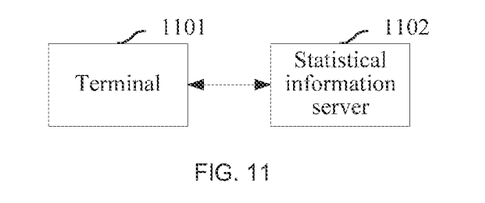
FIG. 11 is a structural diagram of a system for showing a statistical chart according to various embodiments.

FIG. 11 is a structural diagram of a system for displaying a statistical chart according to various embodiments. As shown in FIG. 11, the system includes a terminal 1101 and a statistical information server 1102. The terminal 1101 may include, but is not limited to, a functional mobile phone, a smartphone, a palmtop computer, a PC, a tablet computer, and a PDA.

According to various embodiments, a communication connection between the terminal 1101 and the statistical information server 1102 may be implemented by using various wired or wireless communications networks. According to a relationship between an information transfer direction and time, manners for communication between the terminal and the statistical information server may be classified into simplex communication, half-duplex communication, full-duplex communication, and the like.

The terminal 1101 is configured to request additional to-be-shown data, which is added during the switch from a portrait-orientation-display drawing area to a landscape-orientation-display drawing area, from the statistical information server 1102; determine whether a screen rotation event of switching from portrait-orientation display to landscape-orientation display is received, and if yes, draw the landscape-orientation-display drawing area, where the width of the landscape-orientation-display drawing area is equal to the height of a screen; and display a statistical chart in the drawn landscape-orientation-display drawing area, where the additional to-be-shown data is shown in the statistical chart; and the statistical information server 1102 is configured to send the additional to-be-shown data, which is added during switch from the portrait-orientation-display drawing area to the landscape-orientation-display drawing area, to the terminal 1101 in response to the request from the terminal.

In various embodiments, the terminal 1101 is configured to determine coordinates of an upper-left vertex or coordinates of an upper-right vertex of the landscape-orientation-display drawing area and draw the landscape-orientation-display drawing area from the top of the screen to the bottom of the screen based on the determined coordinates of the upper-left vertex or coordinates of the upper-right vertex of the landscape-orientation-display drawing area and a preset height of the landscape-orientation-display drawing area, where the width of the landscape-orientation-display drawing area is equal to the height of the screen.

In various embodiments, the terminal 1101 is configured to determine coordinates of a lower-right vertex or coordinates of a lower-left vertex of the landscape-orientation-display drawing area; draw the landscape-orientation-display drawing area from the bottom of the screen to the top of the screen based on the determined coordinates of the lower-right vertex or coordinates of the lower-left vertex of the landscape-orientation-display drawing area and a preset height of the landscape-orientation-display drawing area, where the width of the landscape-orientation-display drawing area is equal to the height of the screen.

The terminal 1101 is configured to determine whether a gravity sensor detects the screen rotation event of switching from portrait-orientation display to landscape-orientation display or determine whether a finger operation instruction, which is sent by a user to switch a display state of the screen from portrait-orientation display to landscape-orientation display, is received.

In various embodiments, the terminal 1101 is configured to reserve a statistical chart in the portrait-orientation-display drawing area and hide a top price-prompting area and a bottom trade-volume area; determine a coordinate change relationship between a coordinate system of the portrait-orientation-display drawing area and a coordinate system of the landscape-orientation-display drawing area based on the determined portrait-orientation-display drawing area and landscape-orientation-display drawing area; extend, in the drawn landscape-orientation-display drawing area, the statistical chart in the portrait-orientation-display drawing area based on the coordinate change relationship between the coordinate system of the portrait-orientation-display drawing area and the coordinate system of the landscape-orientation-display drawing area, and show the additional to-be-shown data in the statistical chart; and obtain current data of the top price-prompting area, show the current data in a top price-prompting area of the landscape-orientation-display drawing area, and show the bottom trade-volume area in the landscape-orientation-display drawing area.

In various embodiments, the terminal 1101 determines a coordinate change relationship between a coordinate system of the portrait-orientation-display drawing area and a coordinate system of the landscape-orientation-display drawing area based on the determined portrait-orientation-display drawing area and landscape-orientation-display drawing area; extends, in the drawn landscape-orientation-display drawing area, a statistical chart in the portrait-orientation-display drawing area based on the coordinate change relationship between the coordinate system of the portrait-orientation-display drawing area and the coordinate system of the landscape-orientation-display drawing area; and show the additional to-be-shown data in an extended display part of the statistical chart that is extended in the landscape-orientation-display drawing area.

In various embodiments, the terminal 1102 is configured to divide a time axis of the statistical chart according to a natural time period, where the natural time period at least includes at least one of day, month, quarter, and year.

The statistical information server 1102 is further configured to, before sending the additional to-be-shown data to the terminal, verify whether an identity of the terminal is legal and send the additional to-be-shown data to the terminal when the identity of the terminal is legal, where the verifying, by the statistical information server, whether an identity of the terminal is legal includes verifying whether a fingerprint of the user of the terminal matches an authorized fingerprint, verifying whether an iris of the user matches an authorized iris, or verifying whether an IEMI of the terminal is legal or whether a password set for screen protection of the terminal is correct, or the like.

Figure 12:
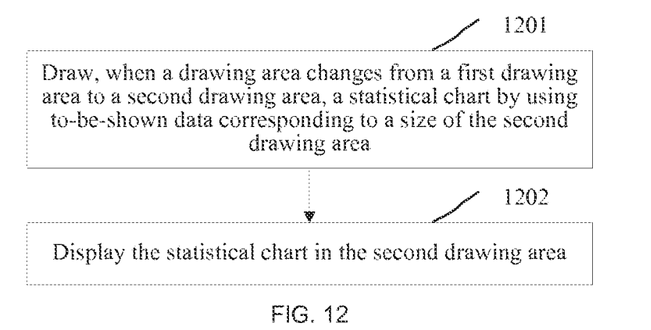
FIG. 12 is a flowchart of a method for displaying a second statistical chart according to various embodiments.

Various embodiments provide another method for displaying a statistical chart. FIG. 12 is a flowchart of a method for displaying a second statistical chart according to various embodiments. As shown in FIG. 12, the process includes the following:

Block 1201: Draw, when a drawing area changes from a first drawing area to a second drawing area, a statistical chart by using to-be-shown data corresponding to a size of the second drawing area.

Block 1202: Display the statistical chart in the second drawing area.

When a size of the first drawing area is smaller than the size of the second drawing area, the method further includes:
determining an additional drawing area; and
obtaining additional to-be-shown data corresponding to a size of the additional drawing area, where the size of the additional drawing area is equal to a difference between the size of the second drawing area and the size of the first drawing area.

According to various embodiments, the drawing area may be of any shape such as a rectangle, a square, or a round. The first drawing area and the second drawing area may be determined with reference to the method in the foregoing embodiments shown in FIG. 3, or the drawing area may be determined in other methods, which is not limited in the present disclosure.

With reference to the foregoing embodiments corresponding to FIG. 3, it is assumed that the first drawing area is a portrait-orientation-display drawing area and the second drawing area is a landscape-orientation-display drawing area. During change of a drawing area, the portrait-orientation-display drawing area changes into the landscape-orientation-display drawing area and a display screen of a terminal device rotates 90 degrees clockwise. During specific application, for example, the display screen rotates at any angle, for example, 45 degrees, clockwise from the portrait-orientation-display drawing area (the first drawing area), and a size of an obtained second drawing area is larger than a size of the first drawing area. Various embodiments are not limited to switch from the portrait-orientation-display drawing area to the landscape-orientation-display drawing area and all other manners which ensure that the size of the second drawing area is larger than the size of the first drawing area after switch, fall within the protection scope of the various embodiments.

In blocks 1201 and 1202, when the size of the second drawing area is larger than the size of the first drawing area, a first statistical chart displayed in the first drawing area may be directly displayed in the second drawing area. A second statistical chart is drawn by using additional to-be-shown data, and the second statistical chart is displayed in the second drawing area. Typically, the second statistical chart and the first statistical chart are connected to form a continuous statistical chart. Certainly, the second statistical chart and the first statistical chart may not be connected.

An entire statistical chart may also be drawn according to first to-be-shown data corresponding to the size of the first drawing area and the additional to-be-shown data and the statistical chart is displayed in the second drawing area. During specific application, the statistical chart may be drawn and displayed with reference to the method in the foregoing embodiments corresponding to FIG. 3.

In blocks 1201 and 1202, if the size of the first drawing area is larger than the size of the second drawing area, it means that the size of the drawing area becomes smaller after the change; therefore, the displayed statistical chart becomes smaller accordingly. For example, with reference to the foregoing embodiments, if the landscape-orientation-display drawing area is the first drawing area and the portrait-orientation-display drawing area is the second drawing area, when the landscape-orientation-display drawing area changes into the portrait-orientation-display drawing area, that is, a display screen rotates 90 degrees clockwise, the size of the drawing area becomes smaller. If the display screen switches from the landscape-orientation-display drawing area to any position between the landscape-orientation-display drawing area and the portrait-orientation-display drawing area, for example, the landscape-orientation-display drawing area rotates 45 degrees anticlockwise, the size of the drawing area becomes smaller accordingly. All other manners which ensure that the drawing area becomes smaller fall within the protection scope of the present disclosure.

In this case, it may be unnecessary to draw an additional statistical chart. Instead, a section of statistical chart is severed from the first statistical chart, which is drawn by using first to-be-shown data corresponding to the size of the first drawing area. As long as it is ensured that the severed statistical chart matches the size of the second drawing area, the severed statistical chart can be displayed in the second drawing area.

To-be-shown data corresponding to the size of the second drawing area may be obtained according to the size of the second drawing area, and the statistical chart is drawn by using the obtained to-be-shown data.

Figure 13:
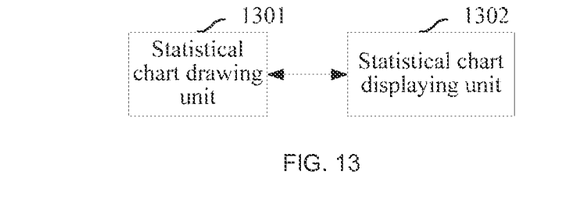
FIG. 13 is a structural diagram of an apparatus for displaying a second statistical chart according to various embodiments.

Various embodiments provide an apparatus for displaying a statistical chart. FIG. 13 is a structural diagram of an apparatus for displaying a second statistical chart according to various embodiments.

The displaying apparatus includes a statistical chart drawing unit 1301 and a statistical chart displaying unit 1302. The statistical chart drawing unit 1301 is configured to draw, when a drawing area changes from a first drawing area to a second drawing area, a statistical chart by using to-be-shown data corresponding to a size of the second drawing area. The statistical chart displaying unit 1302 is configured to display the statistical chart in the second drawing area. When a size of the first drawing area is smaller than the size of the second drawing area, the displaying apparatus further includes an additional drawing area determining unit and an additional to-be-shown data obtaining unit. The additional drawing area determining unit is configured to determine an additional drawing area. The additional to-be-shown data obtaining unit is configured to obtain additional to-be-shown data corresponding to a size of the additional drawing area. The size of the additional drawing area is equal to a difference between the size of the second drawing area and the size of the first drawing area.

According to various embodiments, the statistical chart drawing unit 1301 is further configured to draw the second statistical chart by using the additional to-be-shown data. The statistical chart displaying unit 1302 is further configured to display a first statistical chart, which is drawn by using first to-be-shown data corresponding to the size of the first drawing area, in the second drawing area and display the second statistical chart in the second drawing area. According to various embodiments, the statistical chart drawing unit 1301 is further configured to draw the statistical chart by using first to-be-shown data corresponding to the size of the first drawing area, and the additional to-be-shown data.

According to various embodiments, when the size of the first drawing area is larger than the size of the second drawing area:

the statistical chart drawing unit 1301 is further configured to sever a section of statistical chart from the first statistical chart, which is drawn by using first to-be-shown data corresponding to the size of the first drawing area, where the severed statistical chart matches the size of the second drawing area; and the statistical chart displaying unit 1302 is further configured to display the severed statistical chart in the second drawing area.

Figure 14:
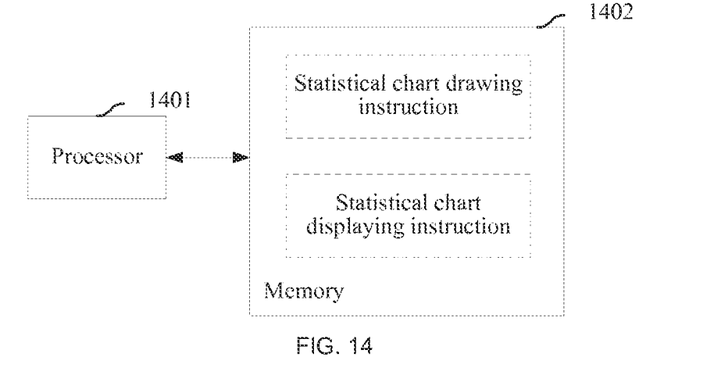
FIG. 14 is a structural diagram of an apparatus for displaying a third statistical chart according to various embodiments.

FIG. 14 is a structural diagram of an apparatus for displaying a third statistical chart according to various embodiments. As shown in FIG. 14, the apparatus includes a processor 1401 and a memory 1402. The memory 1402 is configured to store a statistical chart drawing instruction and a statistical chart displaying instruction.

The processor 1401 is configured to communicate with the memory;

execute the statistical chart drawing instruction, so as to draw, when a drawing area changes from a first drawing area to a second drawing area, a statistical chart by using to-be-shown data corresponding to the size of the second drawing area; and execute the statistical chart displaying instruction, so as to display the statistical chart in the second drawing area.

According to various embodiments, when the size of the first drawing area is smaller than the size of the second drawing area, the memory 1402 further includes an additional drawing area determining instruction and an additional to-be-shown data obtaining instruction.

The processor 1401 further executes the additional drawing area determining instruction, so as to determine an additional drawing area and further executes the additional to-be-shown data obtaining instruction, so as to obtain additional to-be-shown data corresponding to a size of the additional drawing area. The size of the additional drawing area is equal to a difference between the size of the second drawing area and the size of the first drawing area.

According to various embodiments, the processor 1402 further executes the statistical chart drawing instruction, so as to draw a second statistical chart by using the additional to-be-shown data and further executes the statistical chart displaying instruction, so as to display a first statistical chart, which is drawn by using first to-be-shown data corresponding to the size of the first drawing area, in the second drawing area and display the second statistical chart in the second drawing area.

According to various embodiments, the processor 1401 further executes the statistical chart drawing instruction, so as to draw the statistical chart by using first to-be-shown data corresponding to the size of the first drawing area, and the additional to-be-shown data.

According to various embodiments, when the size of the first drawing area is larger than the size of the second drawing area, the processor 1401 further executes the statistical chart drawing instruction, so as to sever a section of statistical chart from the first statistical chart, which is drawn by using first to-be-shown data corresponding to the size of the first drawing area, where the severed statistical chart matches the size of the second drawing area; and further executes the statistical chart displaying instruction, so as to display the severed statistical chart in the second drawing area.

Various embodiments further disclose a non-transitory computer readable storage medium, where computer executable instructions are stored therein, and the foregoing methods are executed when these executable instructions run in a computer.

The methods shown in FIG. 3 and FIG. 12 may be integrated in a form of instructions into various network hardware entities. For example, the method for displaying a statistical chart may be integrated in a form of an instruction into a device such as a functional mobile phone, a smartphone, a palmtop computer, a PC, a tablet computer, or a PDA.

The apparatus for displaying a statistical chart in various embodiments may be specifically implemented in various forms. For example, by following an application program interface of a certain standard, a plug-in program may be compiled for displaying of a statistical chart or displaying of a statistical chart may be encapsulated into an application program for a user to download for use. When a plug-in program is compiled for the displaying of a statistical chart, the plug-in program may be implemented in various forms of plug-ins such as ocx, dll, and cab. The apparatus for displaying a statistical chart in the various embodiments may also be implemented by using specific technologies such as a Flash plug-in, a RealPlayer plug-in, an MMS plug-in, an MI staff plug-in, and an ActiveX plug-in.

The method for displaying a statistical chart in the various embodiments may be stored in various storage mediums in a form of an instruction or an instruction set. These storage mediums include, but are not limited to, a floppy disk, an optical disc, a DVD, a hard disk, a flash memory, a USB flash drive, a CF card, an SD card, an MMC card, an SM card, a memory stick, and an xD card.

The method for displaying a statistical chart in the various embodiments may be applied to a storage medium based on a flash memory (Nand flash), such as a USB flash drive, a CF card, an SD card, an SDHC card, an MMC card, an SM card, a memory stick, or an xD card.

According to various embodiments, additional to-be-shown data added during switch from a portrait-orientation-display drawing area to a landscape-orientation-display drawing area is obtained; whether a screen rotation event of switching from portrait-orientation display to landscape-orientation display is received is determined, and if yes, the landscape-orientation-display drawing area is drawn, where the width of the landscape-orientation-display drawing area is equal to the height of a screen; and a statistical chart is displayed in the drawn landscape-orientation-display drawing area, where the additional to-be-shown data is shown in the statistical chart. As can be seen, after the various embodiments are applied, when a terminal is switched from a portrait-orientation state to a landscape-orientation state, more data of a statistical chart can be obtained, so as to fill a drawing area in the landscape-orientation state. In this way, a data volume of shown content can be dynamically adjusted according to a change of a drawing area, thereby greatly improving utilization of a screen.

According to various embodiments, a time axis is divided according to a period such as a natural week, month, or year, so that a user can conveniently recognize a stock price trend of a certain day or a certain date, thereby improving utilization of a trend chart.

Various embodiments may be applied to various terminal entities. The various embodiments can be used across platforms and across terminals and have a wide scope of application.

The foregoing descriptions are merely preferred embodiments of the present disclosure, but are not intended to limit the protection scope of the present disclosure. Any modification, equivalent replacement, or improvement made within the spirit and principle of the present disclosure shall fall within the protection scope of the present disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for displaying a statistical chart, comprising:
   providing a processor that implements:
   determining whether a screen rotation event of switching from portrait-orientation display to landscape-orientation display is received, and obtaining additional to-be-shown data added during switch from a portrait-orientation-display drawing area to a landscape-orientation-display drawing area if yes, and drawing the landscape-orientation-display drawing area; and
   displaying a statistical chart in the drawn landscape-orientation-display drawing area, the additional to-be-shown data being shown in the statistical chart;
   wherein the displaying a statistical chart in the drawn landscape-orientation-display drawing area, the additional to-be-shown data being shown in the statistical chart comprises:

determining a coordinate change relationship between a coordinate system of the portrait-orientation-display drawing area and a coordinate system of the landscape-orientation-display drawing area based on the determined portrait-orientation-display drawing area and landscape-orientation-display drawing area;

extending, in the drawn landscape-orientation-display drawing area, a statistical chart in the portrait-orientation-display drawing area based on the coordinate change relationship between the coordinate system of the portrait-orientation-display drawing area and the coordinate system of the landscape-orientation-display drawing area; and showing the additional to-be-shown data in an extended display part of the statistical chart that is extended in the landscape-orientation-display drawing area.

2. The method for displaying a statistical chart according to claim 1, wherein the drawing the landscape-orientation-display drawing area comprises:

determining coordinates of an upper-left vertex or coordinates of an upper-right vertex of the landscape-orientation-display drawing area; and drawing the landscape-orientation-display drawing area from the top of a screen to the bottom of the screen based on the determined coordinates of the upper-left vertex or coordinates of the upper-right vertex of the landscape-orientation-display drawing area and a preset height of the landscape-orientation-display drawing area, wherein the width of the landscape-orientation-display drawing area is equal to the height of the screen.

3. The method for displaying a statistical chart according to claim 1, wherein the drawing the landscape-orientation-display drawing area comprises:

determining coordinates of a lower-right vertex or coordinates of a lower-left vertex of the landscape-orientation-display drawing area; and drawing the landscape-orientation-display drawing area from the bottom of a screen to the top of the screen based on the determined coordinates of the lower-right vertex or coordinates of the lower-left vertex of the landscape-orientation-display drawing area and a preset height of the landscape-orientation-display drawing area, wherein the width of the landscape-orientation-display drawing area is equal to the height of the screen.

4. The method for displaying a statistical chart according to claim 1, wherein the displaying a statistical chart in the drawn landscape-orientation-display drawing area, the additional to-be-shown data being shown in the statistical chart comprises:

reserving a statistical chart in the portrait-orientation-display drawing area, and hiding a top price-prompting area and a bottom trade-volume area;

determining a coordinate change relationship between a coordinate system of the portrait-orientation-display drawing area and a coordinate system of the landscape-orientation-display drawing area based on the determined portrait-orientation-display drawing area and landscape-orientation-display drawing area, extending, in the drawn landscape-orientation-display drawing area, the statistical chart in the portrait-orientation-display drawing area based on the coordinate change relationship between the coordinate system of the portrait-orientation-display drawing area and the coordinate system of the landscape-orientation-display drawing area, and showing the additional to-be-shown data in the statistical chart; and obtaining current data of the top price-prompting area, showing the current data in a top price-prompting area of the landscape-orientation-display drawing area, and showing the bottom trade-volume area in the landscape-orientation-display drawing area.

5. A method for displaying a statistical chart, comprising:

providing a processor that implements:

drawing, when a drawing area changes from a first drawing area to a second drawing area, a statistical chart by using to-be-shown data corresponding to a size of the second drawing area; and displaying the statistical chart in the second drawing area;

the drawing a statistical chart by using to-be-shown data corresponding to a size of the second drawing area comprises:

drawing a second statistical chart by using the additional to-be-shown data; and the displaying the statistical chart in the second drawing area comprises:

displaying a first statistical chart, which is drawn by using to-be-shown data corresponding to the size of the first drawing area, in the second drawing area, and displaying the second statistical chart in the second drawing area.

6. The method for displaying a statistical chart according to claim 5, when a size of the first drawing area is smaller than the size of the second drawing area, further comprising:

determining an additional drawing area; and obtaining additional to-be-shown data corresponding to a size of the additional drawing area, wherein the size of the additional drawing area is equal to a difference between the size of the second drawing area and the size of the first drawing area.

7. The method for displaying a statistical chart according to claim 6, wherein the drawing a statistical chart by using to-be-shown data corresponding to a size of the second drawing area comprises:

drawing the statistical chart by using first to-be-shown data corresponding to the size of the first drawing area, and the additional to-be-shown data.

8. The method for displaying a statistical chart according to claim 5, wherein when a size of the first drawing area is larger than the size of the second drawing area, the drawing a statistical chart by using to-be-shown data corresponding to a size of the second drawing area comprises:

severing a section of statistical chart from a first statistical chart, which is drawn by using first to-be-shown data corresponding to the size of the first drawing area, wherein the severed statistical chart matches the size of the second drawing area; and the displaying the statistical chart in the second drawing area comprises:

displaying the severed statistical chart in the second drawing area.

9. An apparatus for displaying a statistical chart, comprising: a processor and a memory;

wherein the memory stores a statistical chart drawing instruction and a statistical chart displaying instruction;

the processor executes the statistical chart drawing instruction, to draw, when a drawing area changes from a first drawing area to a second drawing area, a statistical chart by using to-be-shown data corresponding to a size of the second drawing area; and the processor executes the statistical chart displaying instruction, to display the statistical chart in the second drawing area;

the processor further executes the statistical chart drawing instruction to draw a second statistical chart by using the additional to-be-shown data; and the processor further executes the statistical chart displaying instruction to display a first statistical chart, which is drawn by using first to-be-shown data corresponding to the size of the first drawing area in the second drawing area, and display the second statistical chart in the second drawing area.

10. The apparatus for displaying a statistical chart according to claim 9, wherein when a size of the first drawing area is smaller than the size of the second drawing area, the memory further comprises:

an additional drawing area determining instruction, executed by the processor to determine an additional drawing area; and an additional to-be-shown data obtaining instruction, executed by the processor to obtain additional to-be-shown data corresponding to a size of the additional drawing area, wherein the size of the additional drawing area is equal to a difference between the size of the second drawing area and the size of the first drawing area.

11. The apparatus for displaying a statistical chart according to claim 10, wherein the processor further executes the statistical chart drawing instruction to draw the statistical chart by using first to-be-shown data corresponding to the size of the first drawing area, and the additional to-be-shown data.

12. The apparatus for displaying a statistical chart according to claim 9, wherein when a size of the first drawing area is larger than the size of the second drawing area, the processor further executes the statistical chart drawing instruction to sever a section of statistical chart from a first statistical chart, which is drawn by using first to-be-shown data corresponding to the size of the first drawing area, wherein the severed statistical chart matches the size of the second drawing area; and the processor further executes the statistical chart displaying instruction to display the severed statistical chart in the second drawing area.

* * * * *